J. F. GIESE.
TIRE TOOL.
APPLICATION FILED MAY 15, 1919.
1,358,948.
Patented Nov. 16, 1920.
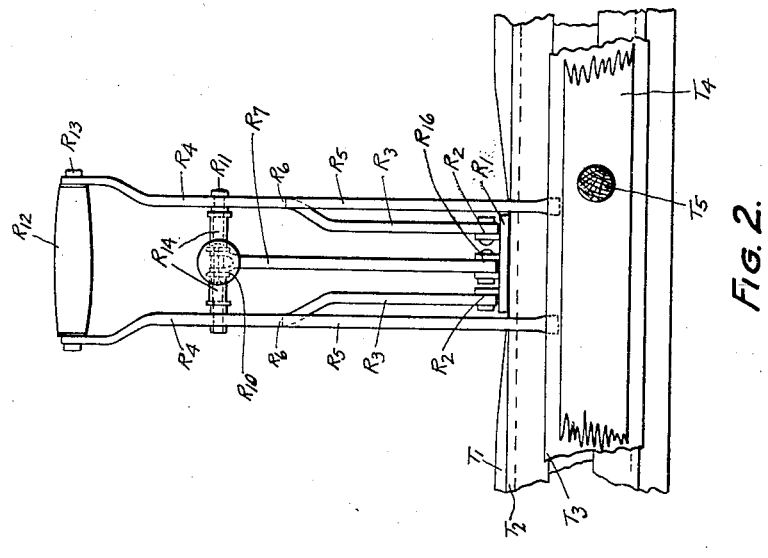
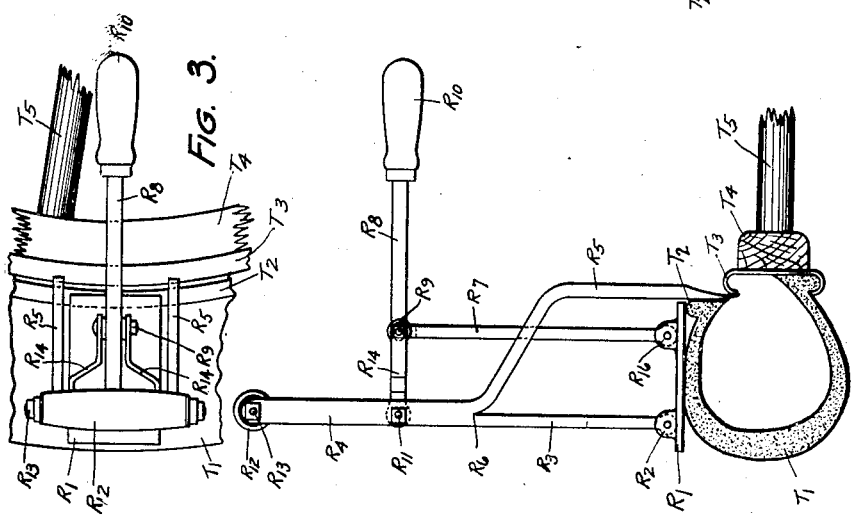
INVENTOR
JOHN F. GIESE.
BY
G E Hamaker
ATTORNEY

UNITED STATES PATENT OFFICE.

JOHN F. GIESE, OF PORTLAND, OREGON.

TIRE-TOOL.

1,358,948.     Specification of Letters Patent.     Patented Nov. 16, 1920.

Application filed May 15, 1919. Serial No. 297,236.

*To all whom it may concern:*

Be it known that I, JOHN F. GIESE, a citizen of the United States, residing at Portland, in the county of Multnomah and State of Oregon, have invented a new and useful Tire-Tool, of which the following is a specification.

My invention relates more particularly to a means for applying a clencher tire to a rim.

The object of my invention is to provide an exceedingly simple and efficient means for applying the clencher tire to a rim without exercising an undue amount of labor, or subjecting the tire to unnecessary wear, and to do this in the shortest space of time.

I accomplish these results in the manner illustrated in the accompanying drawing and set forth in the specification following.

Referring to the drawing. Figure 1 is a side elevation of my invention showing the manner of application to the tire and rim; Fig. 2 is a front elevation of Fig. 1; Fig. 3 is a plan of Fig. 1.

Similar letters and numbers of reference refer to the same or similar parts throughout the several views.

Referring in detail to the drawing. $T^1$ is the usual form of clencher tire of which $T^2$ is the clenching lug and $T^3$ is the curled portion of the rim. $T^4$ is the wood portion of the wheel of which $T^5$ is the spoke.

My invention consists of a crowding member $R^1$ which is a rectangular plate adapted to press against the side of the tire $T^1$ and the clencher lug $T^2$ and is hinged at $R^2$ to the legs $R^3$ of the frames $R^4$. The prying member $R^5$ is pointed to permit its easy insertion between the tire $T^1$ and the rim $T^3$, said prying member being joined to the frames $R^4$ at $R^6$; it being understood that the parts $R^2$, $R^3$, $R^4$ and $R^5$ are in duplicate,—that is they form a pair of frames, whereas the crowding link $R^7$, which is used to operate the crowding member $R^1$, is mounted midway between the prying members $R^5$ and is joined to the crowding member $R^1$ at the joint $R^{16}$. The link $R^7$ is operated by the hand lever $R^8$ to which it is joined by the bolt $R^9$, said hand lever being supplied with a handle $R^{10}$ and is joined to the frame $R^4$ by the bolt $R^{11}$. The upper end of the frames $R^4$ are united by the handle $R^{12}$ by means of the bolt $R^{13}$. The lever $R^8$ is braced laterally by the members $R^{14}$ which extend from the bolt $R^9$ to the bolt $R^{11}$ on each side of the lever $R^8$.

The operation of my device is as follows. When using my tire tool to put a tire on a rim it is only necessary to apply the tire to the rim as far as it will go by hand and then insert the point of the prying members $R^5$ between the tire $T^1$ and the rim $R^3$, and then by bearing against the handle $R^{12}$ cause the clencher lug $T^2$ to occupy the position as shown in Fig. 1, after which it is apparent that any motion of the handle $R^{10}$ toward the wheel will force the clencher lug into its proper place at $T^3$.

While I have thus illustrated and described my invention it not my intention to limit myself to this precise form or method of application, but desire that it shall cover all forms and modifications that fall fairly within the appended claims.

What I claim as new and desire to protect by Letters Patent of the United States is:

1. In a tire tool, the combination of a pair of bifurcated frame members one forked leg of each frame member being straight, and the other off-set, a handle adapted to join the single upper ends of said frame members, a crowding member hinged to the feet of both of the straight leg members and adapted to swing between said straight legs and said off-set legs, a crowding lever pivoted between said bifurcated frame members, a link adapted to join said crowding lever to said crowding member, and a means for prying the tire outside of the circumference of the wheel rim consisting of a pointed end at the foot of the off-set leg of said frame member.

2. A tire tool consisting of a pair of frame members joined at their upper ends, a tire crowding means consisting of a gate hinged to the feet of said frames, prying members each forming a fork below the center of said frame member and extending below the feet of same, the lowermost ends of said prying member having flat points, a crowding lever hinged between said frame members slightly above the forks, a link adapted to join said crowding lever to said crowding member, and a means for holding said crowding lever in the same plane as is the crowding member consisting of a pair of bent links adapted to act as braces between said lever and the axis of its hinge.

JOHN F. GIESE.